US007503073B2

(12) United States Patent
Kawamoto et al.

(10) Patent No.: US 7,503,073 B2
(45) Date of Patent: Mar. 10, 2009

(54) INFORMATION MANAGING APPARATUS AND METHOD, RECORDING MEDIUM, AND PROGRAM

(75) Inventors: Yoji Kawamoto, Tokyo (JP); Ryuji Ishiguro, Tokyo (JP); Yuichi Ezura, Kanagawa (JP); Motohiko Nagano, Tokyo (JP)

(73) Assignee: Sony Corporation, Tokyo (JP)

( * ) Notice: Subject to any disclaimer, the term of this patent is extended or adjusted under 35 U.S.C. 154(b) by 733 days.

(21) Appl. No.: 10/480,312

(22) PCT Filed: Apr. 10, 2003

(86) PCT No.: PCT/JP03/04548

§ 371 (c)(1),
(2), (4) Date: Dec. 11, 2003

(87) PCT Pub. No.: WO03/088058

PCT Pub. Date: Oct. 23, 2003

(65) Prior Publication Data

US 2005/0075981 A1 Apr. 7, 2005

(30) Foreign Application Priority Data

Apr. 15, 2002 (JP) ............................. 2002-111555

(51) Int. Cl.
*G06F 7/04* (2006.01)
*H04L 9/32* (2006.01)
(52) U.S. Cl. .............................. 726/27; 726/28; 726/30; 713/189
(58) Field of Classification Search ........................ None
See application file for complete search history.

(56) References Cited

U.S. PATENT DOCUMENTS

| 5,857,021 | A | 1/1999 | Kataoka et al. |
| 6,144,743 | A | 11/2000 | Hisashi et al. |
| 6,574,611 | B1 | 6/2003 | Matsuyama et al. |
| 6,886,017 | B1 * | 4/2005 | Jackson et al. ............ 707/104.1 |
| 7,058,819 | B2 * | 6/2006 | Okaue .......................... 713/193 |
| 7,096,268 | B1 * | 8/2006 | Shoda et al. ................. 709/229 |
| 7,116,785 | B2 * | 10/2006 | Okaue ......................... 380/278 |
| 7,131,010 | B2 * | 10/2006 | Okaue et al. ................ 713/189 |

(Continued)

FOREIGN PATENT DOCUMENTS

EP 0 773 490 5/1997

(Continued)

*Primary Examiner*—Christian LaForgia
(74) *Attorney, Agent, or Firm*—Finnegan, Henderson, Farabow, Garrett & Dunner, L.L.P.

(57) ABSTRACT

The present invention relates to an information managing apparatus and method, a recording medium, and a program in which unauthorized use of content can be prevented. A ripping module 91 of a client 1 retrieves the content recorded on a CD 81. In the client 1, a content ID for identifying the content and a unique ID unique to the client 1 are generated, and these IDs are added to the content retrieved by the ripping module 91. A usage right containing the usage conditions of the content, etc., is generated and saved. The usage right includes information indicating that an apparatus (client) having the same ID to the unique ID added to the content is only allowed to play back the content. The present invention is applicable to an information processing apparatus such as a personal computer.

6 Claims, 18 Drawing Sheets

U.S. PATENT DOCUMENTS

| | | |
|---|---|---|
| 7,143,445 B1 | 11/2006 | Ishiguro et al. |
| 7,228,568 B2 * | 6/2007 | Abe et al. .................... 726/31 |
| 7,260,721 B2 * | 8/2007 | Tanaka et al. ............... 713/170 |
| 2002/0002468 A1 * | 1/2002 | Spagna et al. ................. 705/1 |
| 2002/0002541 A1 * | 1/2002 | Williams ..................... 705/51 |
| 2002/0049580 A1 | 4/2002 | Kutaragi et al. |
| 2002/0077988 A1 * | 6/2002 | Sasaki et al. ................ 705/59 |
| 2002/0094088 A1 * | 7/2002 | Okaue ....................... 380/278 |
| 2002/0108036 A1 * | 8/2002 | Okaue ....................... 713/168 |
| 2002/0108055 A1 * | 8/2002 | Okaue ....................... 713/200 |
| 2002/0114466 A1 * | 8/2002 | Tanaka et al. ............... 380/232 |
| 2002/0116622 A1 * | 8/2002 | Okaue et al. ................ 713/189 |
| 2002/0136411 A1 * | 9/2002 | Ishiguro et al. ............. 380/278 |
| 2002/0143902 A1 * | 10/2002 | Chung et al. ................ 709/219 |
| 2002/0150250 A1 * | 10/2002 | Kitaya et al. ............... 380/277 |
| 2002/0176576 A1 * | 11/2002 | Abe et al. ................... 380/227 |
| 2002/0186844 A1 * | 12/2002 | Levy et al. .................. 380/231 |
| 2003/0135464 A1 * | 7/2003 | Mourad et al. ............... 705/50 |
| 2003/0140009 A1 * | 7/2003 | Namba et al. ................ 705/59 |
| 2004/0039911 A1 * | 2/2004 | Oka et al. ................... 713/175 |

FOREIGN PATENT DOCUMENTS

| | | |
|---|---|---|
| EP | 0 773 490 A1 | 5/1997 |
| EP | 1 035 543 | 9/2000 |
| EP | 1 043 878 A2 | 10/2000 |
| EP | 1 058 255 | 12/2000 |
| EP | 1 058 255 A2 | 12/2000 |
| EP | 1 152 397 | 11/2001 |
| JP | 63-112870 | 5/1988 |
| JP | 63-132336 | 6/1988 |
| JP | 01-234935 | 9/1988 |
| JP | 63-213027 | 9/1988 |
| JP | 1-234935 | 9/1989 |
| JP | 04-232586 | 12/1990 |
| JP | 4-232586 | 8/1992 |
| JP | 04-247737 | 9/1992 |
| JP | 9-134330 | 5/1997 |
| JP | 10-003745 | 1/1998 |
| JP | 10-011282 | 1/1998 |
| JP | 10-208388 | 8/1998 |
| JP | 2000-099010 | 9/1998 |
| JP | 11-185383 | 7/1999 |
| JP | 2000-099010 | 4/2000 |
| JP | 2000-260121 | 9/2000 |
| JP | 2000-357196 | 12/2000 |
| JP | 2001-51906 | 2/2001 |
| JP | 2001-66986 | 3/2001 |
| JP | 2001-067324 | 3/2001 |
| JP | 2001-215974 | 8/2001 |
| JP | 2001-236080 | 8/2001 |
| JP | 2001-331664 | 11/2001 |
| JP | 2001-344437 | 12/2001 |
| JP | 2001-352321 | 12/2001 |
| JP | 2002-082917 | 3/2002 |
| JP | 2002-82917 | 3/2002 |
| JP | 2002-099342 | 4/2002 |
| JP | 2002-099466 | 4/2002 |
| WO | WO 01/99331 A1 | 12/2001 |
| WO | WO 02/03654 | 1/2002 |

* cited by examiner

FIG. 7

| VERSION: t | |
|---|---|
| INDEX | ENCRYPTED KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

FIG. 8

| VERSION: t | |
|---|---|
| INDEX | ENCRYPTED KEY |
| 000 | Enc(K000, K(t)00) |
| 001 | Enc(K(t)001, K(t)00) |
| 0010 | Enc(K0010, K(t)001) |

FIG. 16

| VERSION |
|---|
| PROFILE |
| USAGE-RIGHT ID |
| CREATION DATE |
| EFFECTIVE PERIOD |
| USAGE CONDITIONS |
| CONTENT CONDITIONS |
| CONSTANT VALUE |
| UNIQUE ID |
| SIGNATURE |
| CERTIFICATE |

INFORMATION MANAGING APPARATUS AND METHOD, RECORDING MEDIUM, AND PROGRAM

TECHNICAL FIELD

The present invention relates to an information managing apparatus and method, a recording medium, and a program, and particularly to an information managing apparatus and method, a recording medium, and a program in which unauthorized playback of content can be readily prevented.

BACKGROUND ART

Recently, the prevalence of various broadband environments has exploded, and a variety of content distribution services, including music data, motion picture data, and so on, have become commercially available.

There are subscription-based music distribution services, e.g., "PressPlay (trademark)." In such music distribution services, a user who pays a monthly fixed fee can enjoy music content under predetermined conditions (for example, under conditions where up to 1,000 songs can be played back for streaming playback, up to 100 songs can be downloaded to and saved in a hard disk of a personal computer, up to 20 songs can be copied for writing (copying) onto CD (Compact Disk)-R, and so forth).

One system for managing right information of a user who receives content using such distribution services is disclosed in, for example, Japanese Unexamined Patent Application Publication No. 2001-352321, in which the system has nodes corresponding to a plurality of services which form a tree; wherein an enabling key block (EKB) including key information (DNK (Device Node Key)) assigned to the nodes on a path starting with one node corresponding to a given service and ending with the leaf nodes (devices) belonging to this service is used.

In this system, an EKB is added to the content distributed by a certain service, and a DNK assigned to each device is used to obtain updated key information contained in the EKB, so that the devices allowed to use the service can be managed. The devices which cannot obtain updated key information from the EKB using the DNK are not able to receive the service thereafter.

Therefore, use of the content on each device can be managed without authentication between a server which provides the content and each device.

In such a managing system of content right information, the device which imports the content from, for example, a CD (Compact Disk) uses an ICV (Integrity Check Value) to manage the content.

FIG. 1 is a schematic diagram of a mechanism for managing the imported content based on an ICV.

As shown in FIG. 1, for example, a device, such as a personal computer, registers the content (music data) imported from a CD in a management table of a hard disk, and generates an ICV by applying MAC (Message Authentication Code) (C1, C2, . . . , Cn) generated based on the registered content to ICV=hash (Kicv, C1, C2, . . . , Cn). Kicv is key information for generating the ICV.

The ICV which is generated when the content is created and which is saved securely and the ICV which is newly generated at a predetermined time such as a playback time are compared. When the ICVs match, it is determined that the content has not been tampered with. When the generated ICV does not match that generated when the content is created, it is determined that the content has been tampered with. When it is determined that the content has not been tampered with, the content is played back subsequently. When it is determined that the content has been tampered with, the playback operation is not performed. Therefore, playback of the tampered content can be prevented.

However, the above-described ICV-based content management mechanism has a problem in that an ICV must be generated each time the content is imported or played back, and this operation is burdensome.

Therefore, portable devices, such as music playback devices, must have a high-performance calculation unit having the capable of hash calculation to generate an ICV, and, due to such a calculation unit, the device cost must increase.

DISCLOSURE OF INVENTION

The present invention has been made in view of such problems, and is intended to prevent unauthorized playback of content with ease.

An information managing apparatus of the present invention includes content acquiring means for acquiring content; identification information obtaining means for obtaining identification information for identifying the information managing apparatus; content storing means for storing the content acquired by the content acquiring means, to which the identification information obtained by the identification information obtaining means is added; and usage-right storing means for storing a usage right as information about use of the content, the usage right including the identification information and information for allowing use of the content on an apparatus having the same identification information as the identification information added to the content.

The information managing apparatus may further include playback means for playing back the content, and the playback means may play back the content only when the identification information added to the content and the identification information obtained by the identification information obtaining means are identical.

The content acquiring means acquires the content via a recording medium attached to the information managing apparatus.

The identification information obtaining means may add a random number generated by itself to the content or the like as the identification information. The identification information may be provided from an external device or the like.

An information managing method for an information managing apparatus according to the present invention includes a content acquiring step of acquiring content; an identification information obtaining step of obtaining identification information for identifying the information managing apparatus; a content storing step of storing the content acquired in the content acquiring step, to which the identification information obtained in the identification information obtaining step is added; and a usage-right storing step of storing a usage right as information about use of the content, the usage right including the identification information and information for allowing use of the content on an apparatus having the same identification information as the identification information added to the content.

A recording medium of an information managing apparatus according to the present invention has a program recorded therein, the program causing a computer to execute a content acquisition control step of controlling acquisition of content; an identification information obtaining control step of controlling obtaining of identification information for identifying the information managing apparatus; a content storage control step of controlling storage of the content acquired in the content acquiring control step, to which the identification information obtained in the identification information obtaining control step is added; and a usage-right storage control step of controlling storage of a usage right as information about use of the content, the usage right including the identification information and information for allowing use of the content on an apparatus having the same identification information as the identification information added to the content.

A program according to the present invention causes a computer for controlling an information managing apparatus for managing content to execute a content acquisition control step of controlling acquisition of the content; an identification information obtaining control step of controlling obtaining of identification information for identifying the information managing apparatus; a content storage control step of controlling storage of the content acquired in the content acquisition control step, to which the identification information obtained in the identification information acquiring control step is added; and a usage-right storage control step of controlling storage of a usage right as information about use of the content, the usage right information including the identification information and information for allowing for use of the content on an apparatus having the same identification information as the identification information added to the content.

In the information managing apparatus and method, and program according to the present invention, content is acquired, and identification information for identifying the information managing apparatus is obtained. The acquired content, to which the obtained identification information is added, is stored, and a usage right including the identification information and information for allowing for use of the content on an apparatus having the same identification information as the identification information added to the content is stored as information about use of the content.

BRIEF DESCRIPTION OF THE DRAWINGS

FIG. 7 is a view showing an enabling key block.

FIG. 8 is a view showing another enabling key block.

FIG. 16 is a view showing an example format of the usage right.

BEST MODE FOR CARRYING OUT THE INVENTION

Figure 1:
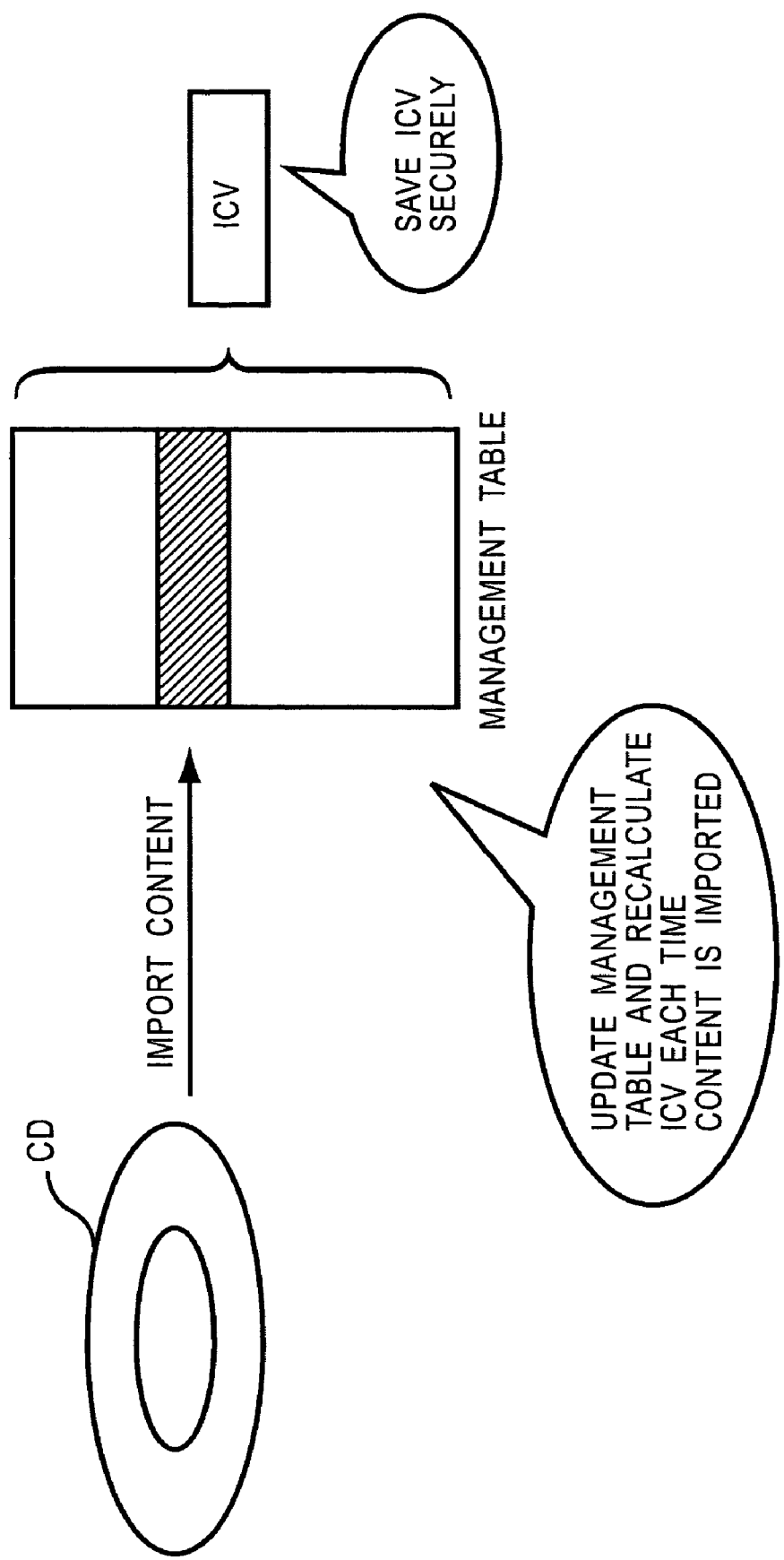
FIG. 1 is a schematic diagram of a content managing system of the related art.
Figure 2:
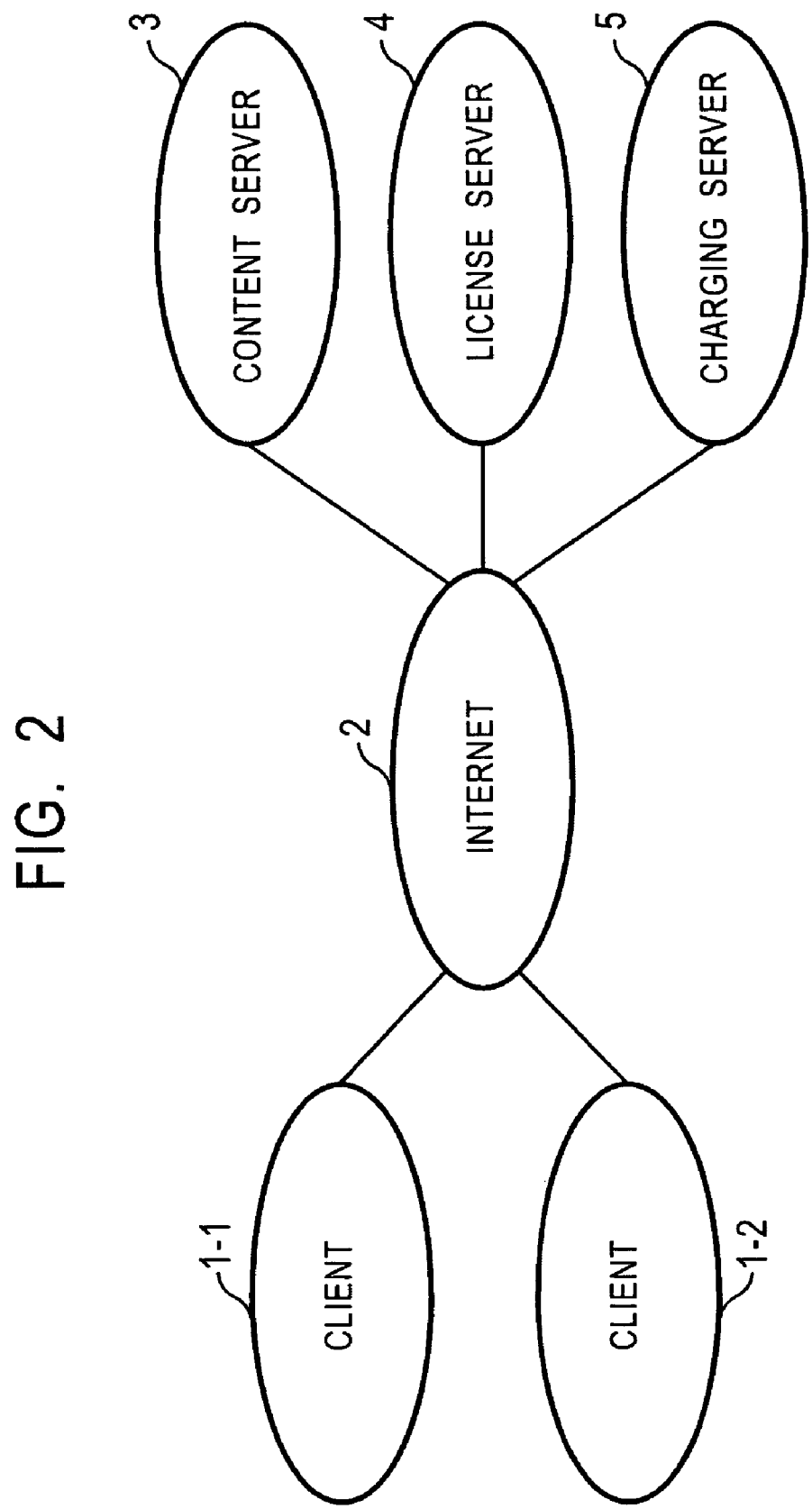
FIG. 2 is a diagram of a content providing system according to the present invention.

FIG. 2 shows a content providing system according to the present invention. Clients 1-1 and 1-2 (hereinafter referred to simply as a client 1 unless these clients need be distinguished from each other) are connected to the Internet 2. Although only two clients are shown in this example, an arbitrary number of clients are connected to the Internet 2.

Also connected to the Internet 2 are a content server 3 for providing the content for the client 1, a license server 4 for giving the client 1 a usage right necessary to use the content provided by the content server 3, and a charging server 5 for charging the client 1 which receives the usage right.

An arbitrary number of content servers 3, license servers 4, and charging servers 5 are connected to the Internet 2.

Figure 3:
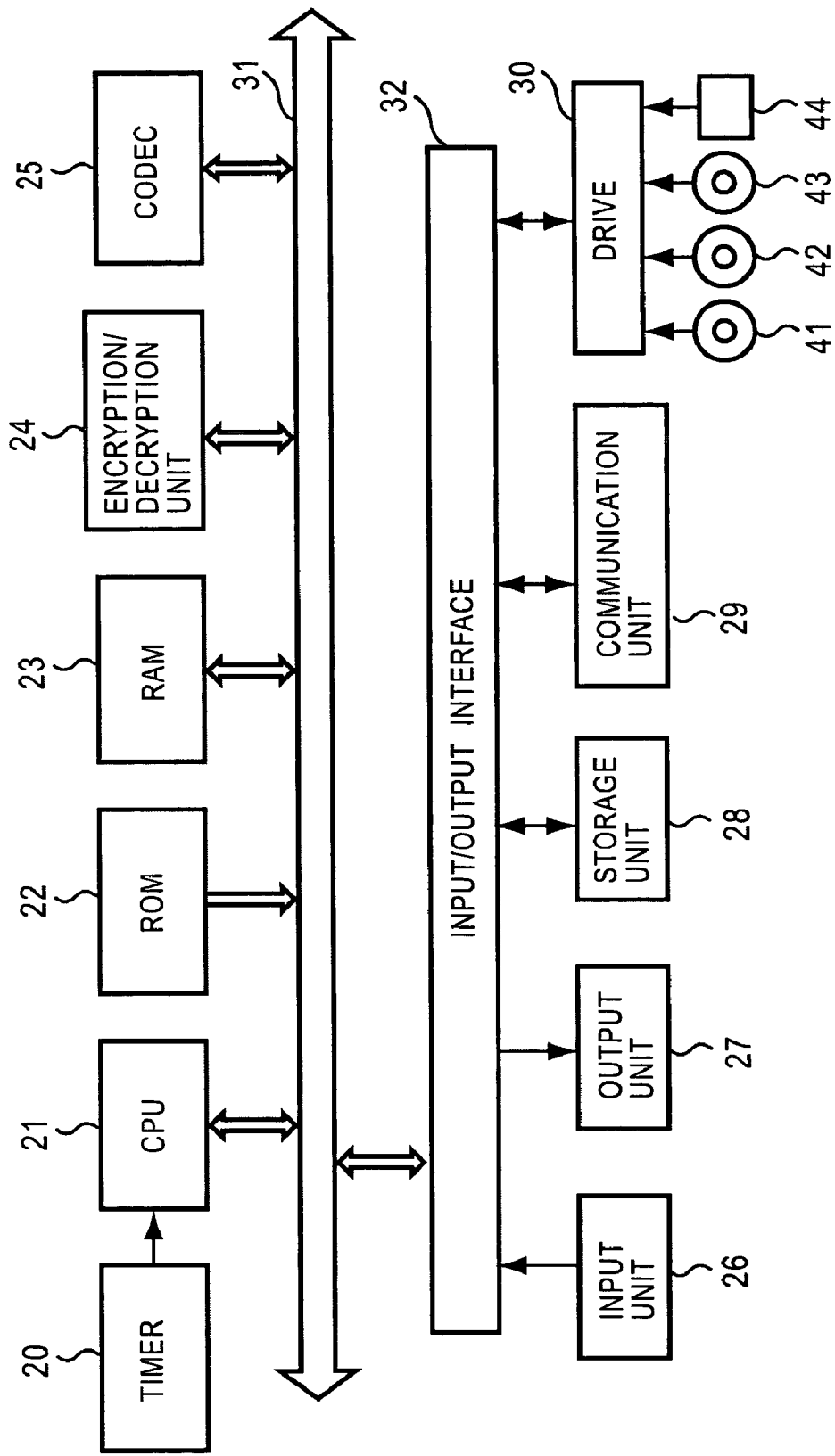
FIG. 3 is a block diagram of a client shown in FIG. 2.

FIG. 3 shows the configuration of the client 1.

In FIG. 3, a CPU (Central Processing Unit) 21 executes various processes according to a program stored in a ROM (Read Only Memory) 22 or a program loaded to a RAM (Random Access Memory) 23 from a storage unit 28. A timer 20 measures the time, and supplies time information to the CPU 21. The RAM 23 also stores data, etc., necessary for the CPU 21 to execute various processes, as required.

An encryption/decryption unit 24 encrypts content and decodes encrypted content. A codec 25 encodes the content according to, for example, ATRAC (Adaptive Transform Acoustic Coding) 3 or the like, and supplies the encoded content to a semiconductor memory 44 connected with a drive 30 via an input/output interface 32, for recording. Otherwise, the codec 25 decodes the encoded data read from the semiconductor memory 44 via the drive 30. The semiconductor memory 44 may be formed of, for example, a memory stick (trademark) or the like.

The CPU 21, the ROM 22, the RAM 23, the encryption/decryption unit 24, and the codec 25 are connected with each other via a bus 31. The input/output interface 32 is also connected with the bus 31.

An input unit 26 including a keyboard, a mouse, and so on, an output unit 27 including a display formed of a CRT (Cathode Ray Tube), an LCD (Liquid Crystal Display), or the like, a speaker, and so on, a storage unit 28 including a hard disk and so on, and a communication unit 29 including a modem, a terminal adapter, and so on are connected with the input/output interface 32. The communication unit 29 performs communication via the Internet 2. The communication unit 29 also performs analog or digital signal communication with another client.

Also connected with the input/output interface 32 is the drive 30, if necessary, to which a magnetic disk 41, an optical disk 42, a magneto-optical disk 43, the semiconductor memory 44, or the like is attached as desired, and a computer program read therefrom is installed in the storage unit 28, if necessary.

Although not shown, basically, the content server 3, the license server 4, and the charging server 5 are also formed of a computer having a similar structure to that of the client 1 shown in FIG. 3. In the following description, the structure shown in FIG. 3 may also be used as the structure of the content server 3, the license server 4, or the charging server 5.

Figure 4:
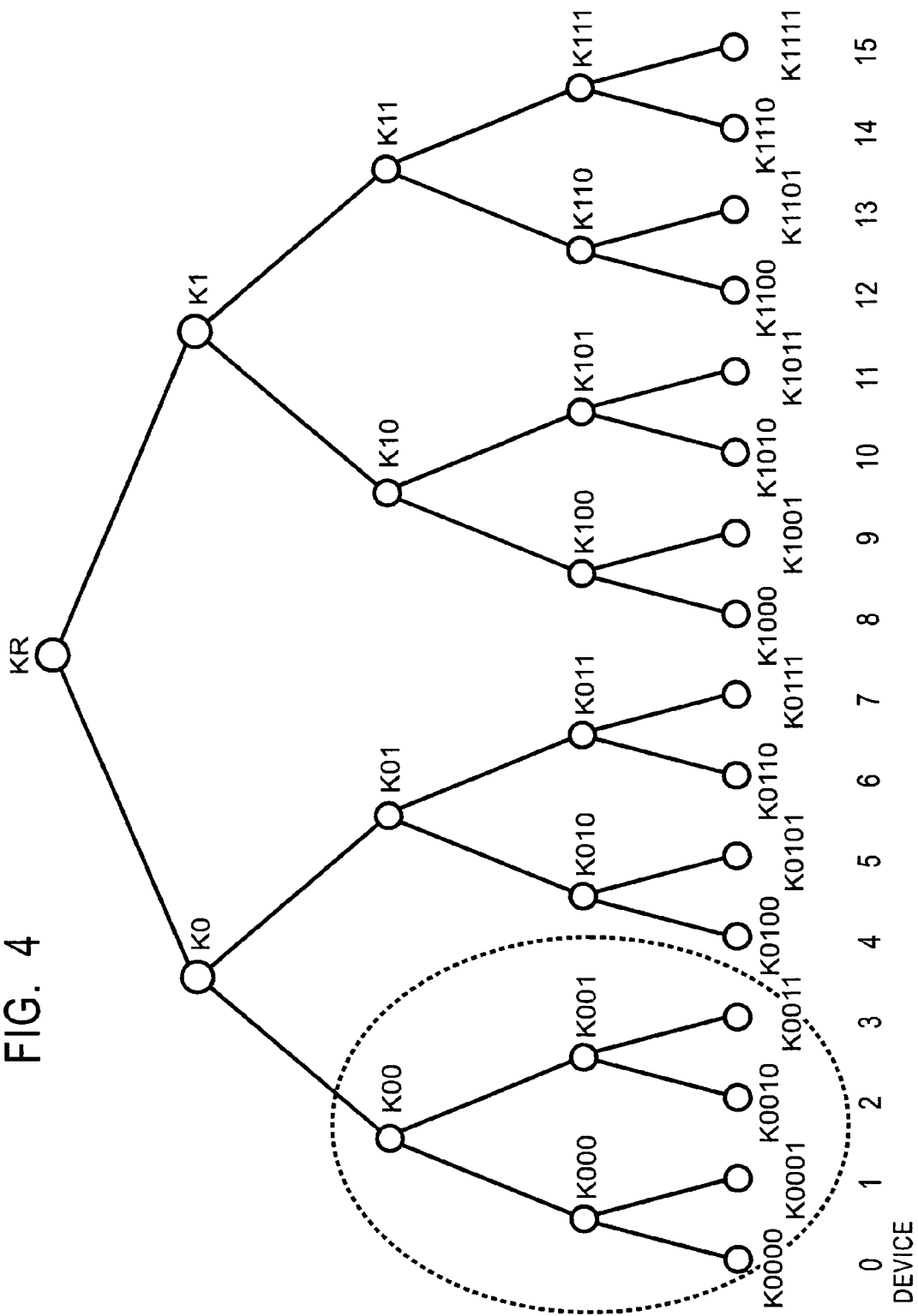
FIG. 4 is a diagram showing the key structure.

In the present invention, as shown in FIG. 4, devices and keys are managed based on the principle of a broadcast encryption scheme. The keys form a hierarchical tree, in which a leaf in the bottom layer represents a key unique to each device. The hierarchical tree-based key management mechanism employed in the system of the present invention is described in Japanese Unexamined Patent Application Publication No. 2001-352321. In the example shown in FIG. 4, keys corresponding to 16 devices numbered 0 to 15 are generated.

The keys are assigned to tree nodes indicated by circles in FIG. 4. In this example, a root key KR (also referred to as Kroot, where applicable) is assigned to the root node in the top layer, and keys K0 and K1 are assigned to the nodes in the second layer. Keys K00 through K11 are assigned to the nodes in the third layer, and keys K000 through K111 are assigned to the nodes in the fourth layer. Keys K0000 through K1111 are assigned to the leaf nodes (device nodes) in the bottom layer.

Due to the layered structure, for example, the key higher than the keys K0010 and K0011 is the key K001, and the key higher than the keys K000 and K001 is the key K00. Likewise, the key higher than the keys K00 and K01 is the key K0, and the key higher than the keys K0 and K1 is the key KR.

A key for using the content is managed based on keys corresponding to the nodes on a single path starting with a device node (leaf) in the bottom layer and ending with the root node in the top layer. For example, a key for using the content on a device corresponding to the leaf numbered 3 is managed based on the keys on the path including the keys K0011, K001, K00, K0, and KR.

Figure 5:
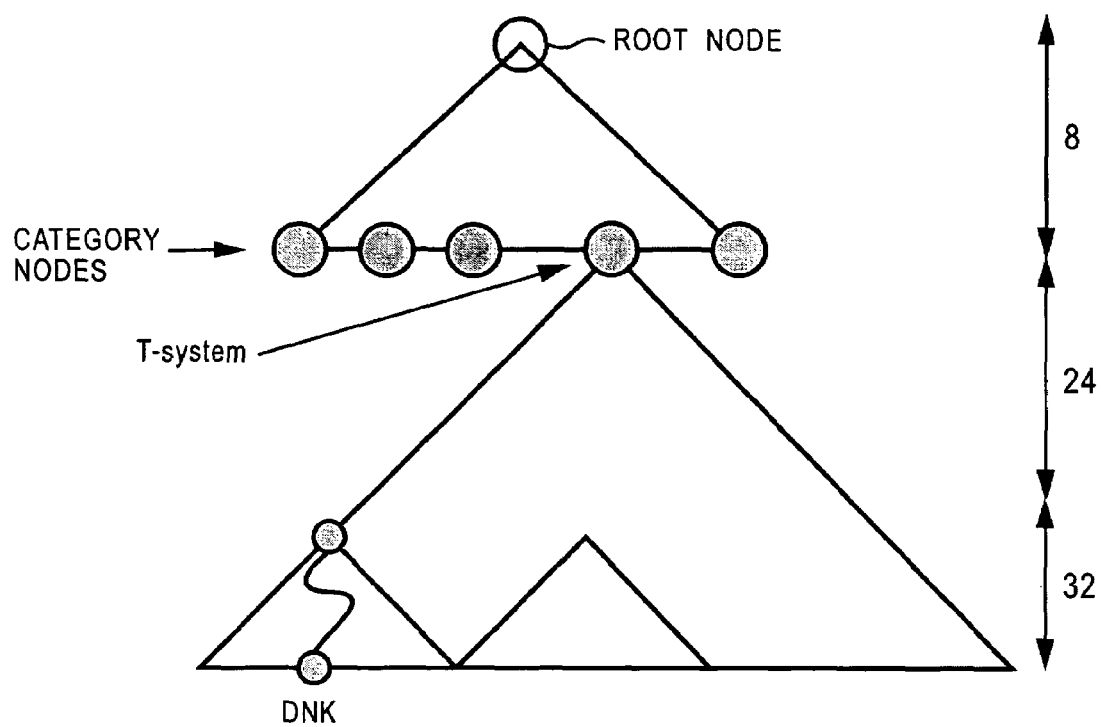
FIG. 5 is a diagram of category nodes.

In the system of the present invention, as shown in FIG. 5, device keys and content keys are managed by a key system formed based on the principle shown in FIG. 4. In the example shown in FIG. 5, nodes in 8+24+32 layers form a tree, and the nodes in the eight layers below and including the root node layer are associated with categories. As used herein, the term category means a category such as the category of a device using a semiconductor memory, e.g., a memory stick, or the category of a digital broadcast receiving device. One of these category nodes is associated with the present system (hereinafter referred to as a T-system, where applicable) serving as a system for managing a usage right.

The keys corresponding to nodes in the 24th layer below the layer of the T-system node are associated with service providers or services provided by the service providers. In the example shown in FIG. 5, therefore, $2^{24}$ (about 16-mega) service providers or services can be assigned. At the bottom of the 32 layers, $2^{32}$ (about 4-giga) users (clients 1) can be assigned. The keys corresponding to the nodes on a path starting with a node in the 32nd layer at the bottom and ending with the T-system node constitute a DNK (Device Node Key), and an ID corresponding to the leaf in the bottom layer is referred to as a leaf ID.

The content key with which the content is encrypted is encrypted using an updated root key KR', and updated node keys in a high layer are encrypted using updated node keys in the layer directly below that layer. These encrypted keys are arranged in an EKB (Enabling Key Block) (described below with reference to FIG. 7).

Updated node keys in the layer one layer higher than the bottom of the EKB are encrypted using the node keys or leaf keys at the bottom of the EKB, and are then arranged in the EKB. The client 1 uses any key of the DNK described in service data to decode the updated node keys in the immediately higher layer described in the EKB distributed together with the content, and uses the resulting node keys to decode the updated node keys in the layer one layer higher than this layer described in the EKB. Similar processing is carried out in turn, and the client 1 can therefore obtain the updated root key KR'. The service data is the data sent from the license server 4 when information about the client 1 is registered. A combination of the service data and a usage right, described below, which is information for allowing for use of particular content, is referred to as a license.

Figure 6:
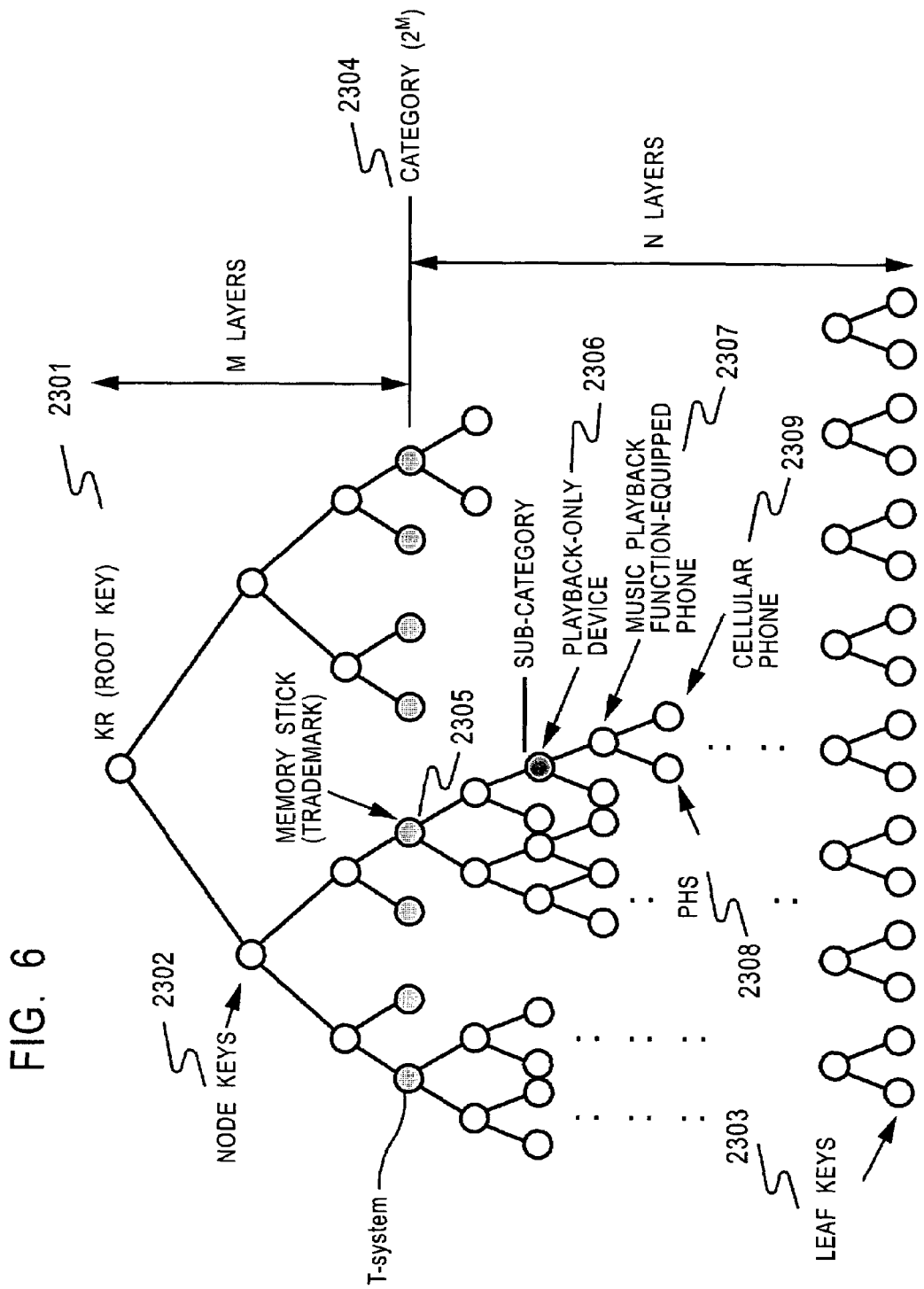
FIG. 6 is a diagram showing the correspondence between nodes and devices.

FIG. 6 shows specific examples of the categories in the hierarchical tree structure.

In FIG. 6, a root key KR 2301 is set at the top of the hierarchical tree, node keys 2302 are set in the lower intermediate layers, and leaf keys 2303 are set at the bottom. Each device has a device node key (DNK) formed of an individual leaf key, a series of node keys starting with the leaf key and ending with the root key, and the root key.

Predetermined nodes at the top down to the M-th layer (in the example shown in FIG. 5, M=8) are set as the category nodes 2304. In other words, each of the nodes in the M-th layer is a node to which a particular category of device is assigned. One of the nodes in the M-th layer is assigned as a root, and the nodes in the (M+1)-th and the following layers and the leaves are the nodes and leaves associated with the devices belonging to this category.

For example, a node 2305 in the M-th layer shown in FIG. 6 is assigned a category [memory stick (trademark)], and the nodes and leaves which follow this node are set as category-specific nodes or leaves including various devices using a memory stick. Thus, the nodes lower than the node 2305 are defined as a set of nodes and leaves associated with the devices defined in the memory stick category.

The nodes in the layers several layers below the M-th layer can be set as sub-category nodes 2306. In the example shown in FIG. 6, a node in the layer two layers below the layer of the category [memory stick] node 2305 is assigned a sub-category node belonging to the category of devices using a memory stick, called a [playback-only device] node 2306. A music playback function-equipped phone node 2307 belonging to the category of playback-only devices is configured below the playback-only-device node 2306 that is a sub-category node, below which a [PHS] node 2308 and a [cellular phone] node 2309 belonging to the category of music playback function-equipped phones are configured.

The categories and sub-categories can be set based on device types as well as arbitrary units, such as unique management nodes of a manufacturer, a content provider, a settlement organization, etc., that is, processing units, management units, or provided service units (these are hereinafter collectively referred to as an entities).

As an example, assuming that a category node is assigned the top node specific to a game device XYZ available from a game device manufacturer, the node keys and leaf keys in the layers below the top node layer can be stored in the game device XYZ available from the manufacturer, and the game device XYZ can be sold. Thereafter, an EKB formed by the node keys and leaf keys under the top node key is generated and distributed, thus allowing for distribution of encrypted content, distribution of various keys, updating of the keys, etc., only on the devices under the top node (the game device XYZ).

Accordingly, updating of keys, etc., can be carried out without any effect on devices which do not belong to the top node but which belong to another category node.

If it is discovered at a time t that the keys K0011, K001, K00, K0, and KR owned by the device 3 have been compromised and revealed by an attacker (hacker), in order to protect data to be exchanged thereafter in the system (a group of the devices 0, 1, 2, and 3), the device 3 must be separated from the system. Therefore, it is necessary to update the node keys K001, K00, K0, and KR to new keys K(t)001, K(t)00, K(t)0, and K(t)R, respectively, and to report the updated keys to the devices 0, 1, and 2. As used herein, K(t)aaa represents an updated key at generation t of a key Kaaa.

A process for distributing the updated keys will now be described. The key updating operation is carried out by sending a table formed of an EKB shown in, for example, FIG. 7 to the devices 0, 1, and 2 over a network or via a predetermined recording medium having the table stored therein. The EKB is formed of encrypted keys for distributing newly updated keys to the devices corresponding to the leaves (the nodes at the bottom) of the tree shown in FIG. 4.

The EKB shown in FIG. 7 is formed as block data having a data structure in which only the devices whose node key must be updated can be updated. FIG. 7 shows block data for distributing updated node keys at generation t to the devices 0, 1, and 2 in the tree shown in FIG. 4.

As is apparent from FIG. 4, the updated node keys K(t)00, K(t)0, and K(t)R must be sent to the devices 0 and 1, and the updated node keys K(t)001, K(t)00, K(t)0, and K(t)R must be sent to the device 2.

As shown in FIG. 7, the EKB contains a plurality of encrypted keys. For example, the encrypted key in the bottom shown in FIG. 7 is Enc(K0010, K(t)001). This means that the updated node key K(t)001 is encrypted using the leaf key K0010 of the device 2, and, therefore, the device 2 can use its leaf key K0010 to decode the encrypted key to obtain the updated node key K(t)001.

The device 2 can further use the updated node key K(t)001 obtained as a result of decoding to decode the encrypted key Enc(K(t)001, K(t)00) in the second row from the bottom shown in FIG. 7 to obtain the updated node key K(t)00.

Likewise, the device 2 can decode the encrypted key Enc (K(t)00, K(t)0) in the second row from the top shown in FIG. 7 to obtain the updated node key K(t)0, and can use the resulting key to decode the encrypted key Enc(K(t)0, K(t)R) in the first row from the top shown in FIG. 7 to obtain the updated root key K(t)R.

The node key K000 is not to be updated, and the updated node keys necessary for the nodes 0 and 1 are K(t)00, K(t)0, and K(t)R.

The nodes 0 and 1 use the device keys K0000 and K0001 to decode the encrypted key Enc(K000, K(t)00) in the third row from the top shown in FIG. 7 to obtain the updated node key K(t)00. Likewise, the nodes 0 and 1 decode the encrypted key Enc(K(t)00, K(t)0) in the second row from the top shown in FIG. 7 in turn to obtain the updated node key K(t)0, and further decode the encrypted key Enc(K(t)0, K(t)R) in the first row from the top shown in FIG. 7 to obtain the updated root key K(t)R. Accordingly, the devices 0, 1, and 2 can obtain the updated key K(t)R.

The index shown in FIG. 7 represents the absolute address of the node keys and leaf keys used as decoding keys to decode the encrypted keys shown in the right column shown in FIG. 7.

In a case where updating of the node keys K(t)0 and K(t)R in higher layers of the tree shown in FIG. 4 is not required and updating of the node key K00 only is required, an EKB shown in FIG. 8 can be used to distribute the updated node key K(t)00 to the devices 0, 1, and 2.

The EKB shown in FIG. 8 is useful for, for example, distributing a new content key shared in a particular group.

For example, it is assumed that the devices 0, 1, 2, and 3 in a group encircled with a dotted line shown in FIG. 4 use a recording medium and a new common content key K(t)con must be assigned to these devices. Then, data Enc(K(t)00, K(t)con) formed by encrypting the new common updated content key K(t)con using the updated K(t)00 of the node key K00 common to the devices 0, 1, 2, and 3 is distributed together with the EKB shown in FIG. 8. This distribution enables distribution of data which cannot be decoded by a device in other groups, such as the device 4.

Specifically, the devices 0, 1, and 2 use the key K(t)00 obtained by processing the EKB to decode the encrypted data to obtain the content key K(t)con at the time t.

Figure 9:
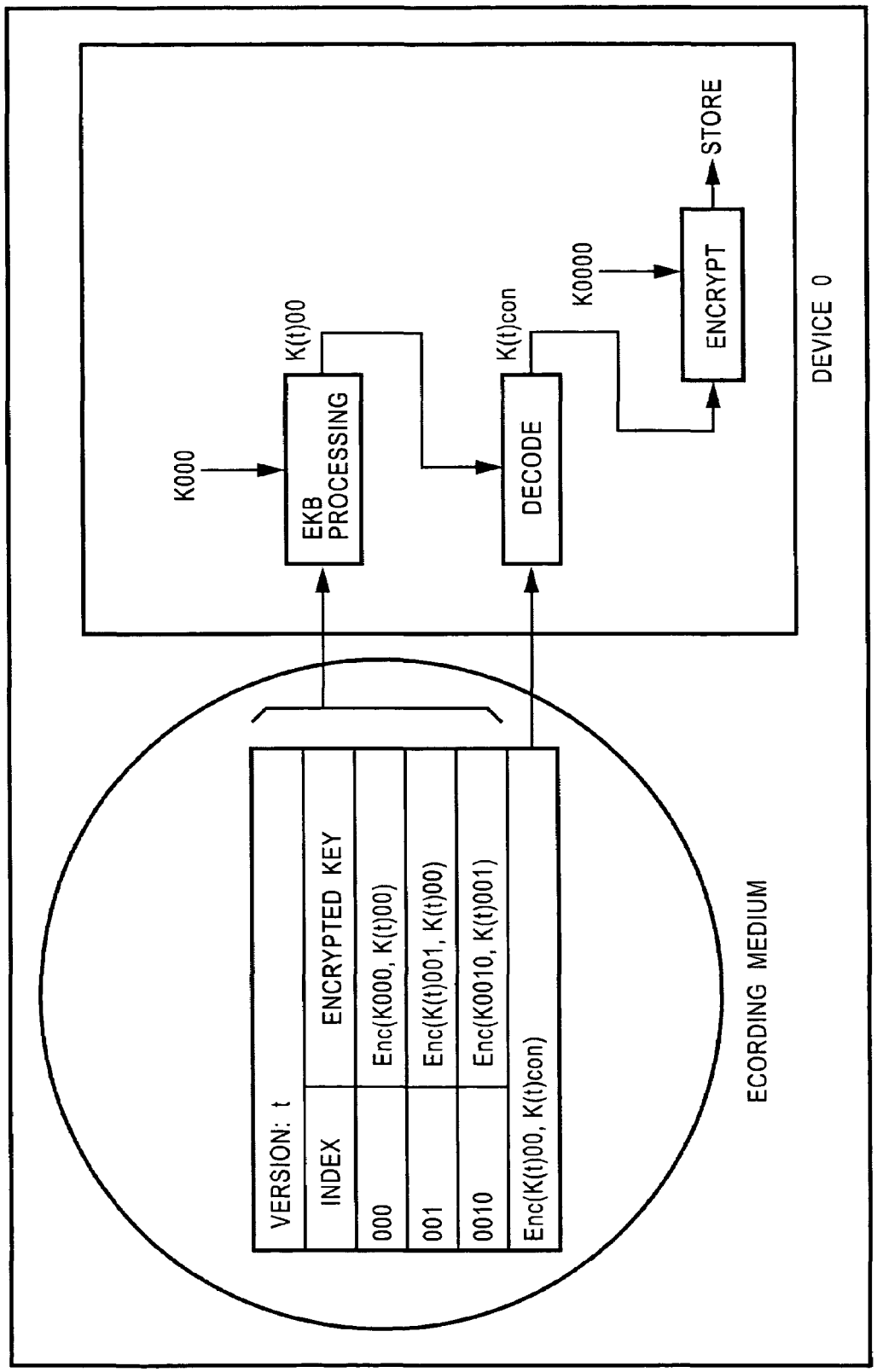
FIG. 9 is a schematic diagram showing usage of the enabling key block.

FIG. 9 is a schematic diagram showing, as a process for obtaining the content key K(t)con at the time t, the processing of the device 0 to which the data Enc(K(t)00, K(t)con) formed by encrypting the new common content key K(t)con using K(t)00, and the EKB shown in FIG. 8 are offered via a predetermined recording medium. In the example shown in FIG. 9, the encrypted message data formed of an EKB is content key K(t)con.

As shown in FIG. 9, the device 0 performs the above-described EKB processing (processing to sequentially decode keys) using the EKB at the generation t stored in the recording medium and the node key K000 assigned thereto in advance to generate the node key K(t)00. The device 0 further uses the decoded updated node key K(t)00 to decode the updated content key K(t)con, and, for later use, encrypts the updated content key K(t)con using the leaf key K0000, which is owned only by the device 0, for storage.

Figure 10:
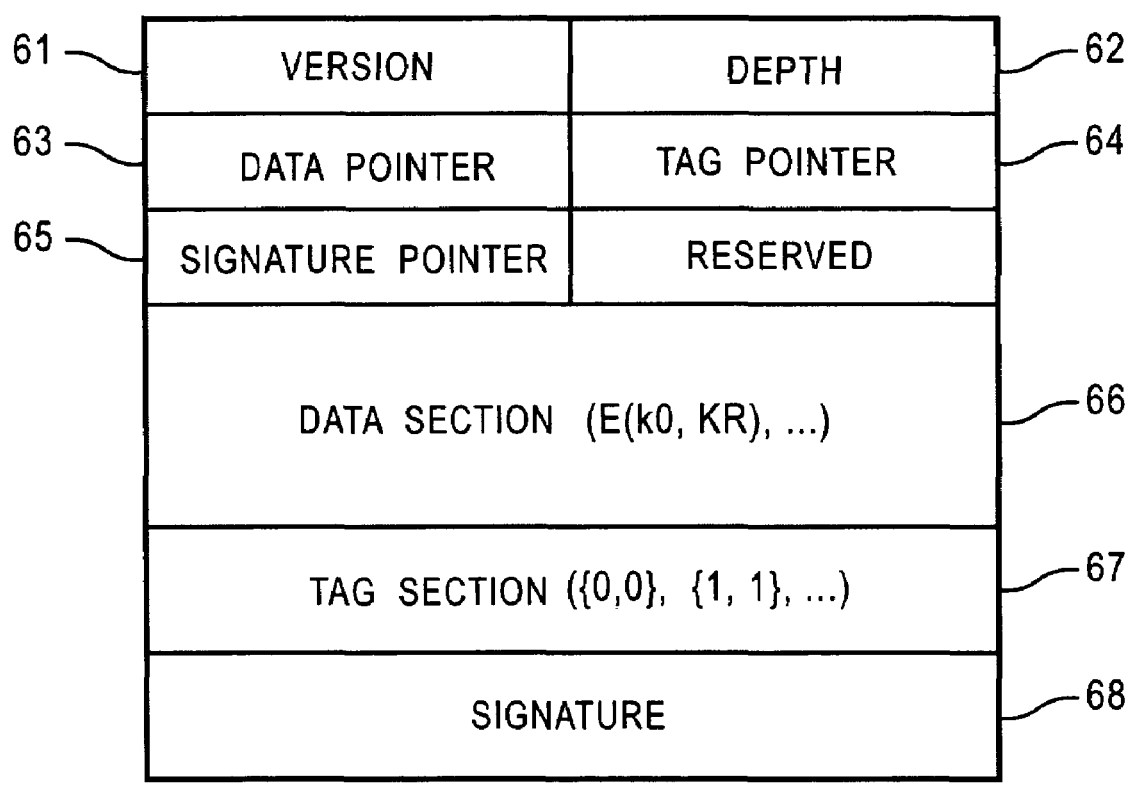
FIG. 10 is a view of an example format of the enabling key block.

FIG. 10 is an illustration of an example format of the EKB, and the EKB including various information is contained at the header of the content data.

A version 61 is an identifier indicating the version of the EKB. The version 61 has functions of identifying the latest EKB and indicating the correspondence with the content. A depth 62 indicates the number of layers in the hierarchical tree for the devices to which the EKB is distributed. A data pointer 63 is a pointer indicating the location of a data section 66 in the EKB, and a tag pointer 64 and a signature pointer 65 are pointers indicating the location of a tag section 67 and a signature 68, respectively.

The data section 66 contains data obtained by, for example, encrypting updated node keys. The data section 66 contains, for example, the encrypted keys of the updated node keys, etc., shown in FIG. 9.

The tag section 67 includes tags indicating the positional relationship between the encrypted node keys and the leaf keys stored in the data section 66. An allocation rule for the tags is described with reference to FIG. 11.

Figure 11:
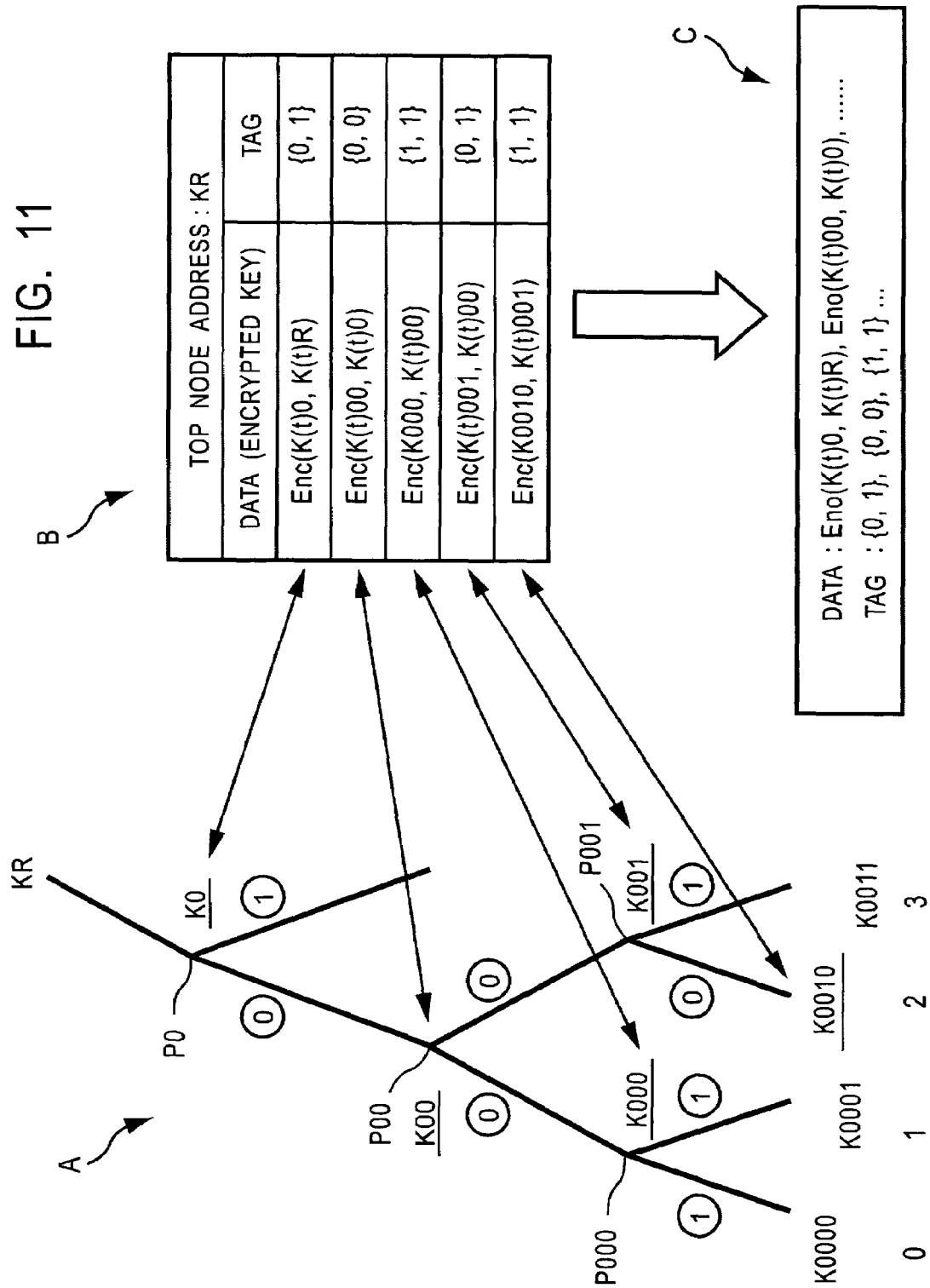
FIG. 11 is a diagram showing the tag structure of the enabling key block.

In the example shown in FIG. 11, as shown in FIG. 11B, the data to be delivered are the encrypted keys shown in FIG. 7. The address of the top node contained in the encrypted key is referred to as a top node address.

In this example, the updated key K(t)R of the root key is contained, and the top node address is KR. For example, the data Enc(K(t)0, K(t)R) in the top layer is located at position P0 in the hieratical tree shown in FIG. 11A. The data in the subsequent layer is Enc(K(t)00, K(t)0), and is located at position P00 left below the previous data Enc(K(t)0, K(t)R) in the tree.

Therefore, each tag is set to 0 when data is located below a predetermined position in the tree, and is set to 1 otherwise. The tags are defined as {left (L) tag, right (R) tag}.

The data Enc(K(t)0, K(t)R) in the top layer shown in FIG. 11B is allocated L tag=0 because data is located at the position P00 left below the corresponding position P0, and is allocated R tag=1 because data is not located at the position right below the position P0. The remaining data is also allocated tags, and a data string and a tag string shown in FIG. 11C are configured.

The tags are allocated in order to indicate the position of the corresponding data Enc(Kxxx, Kyyy) in the tree. The key data Enc(Kxxx, Kyyy) . . . stored in the data section 66 are merely a data sequence of encrypted keys; however, the position of the encrypted keys stored as data in the tree can be determined based on the tags. It is possible to configure, for example, the following data structure using the node indexes corresponded with the encrypted data shown in FIG. 7 or 8 without tags:

0: Enc(K(t)0, K(t)R)
00: Enc(K(t)00, K(t)0)
000: Enc(K((t)000, K(t)00)

However, such a data structure using indexes has a large amount of data, and is not suitable for network distribution, etc. In contrast, the above-described tags are used as index data indicating the position of keys to determine the position of keys with a smaller amount of data.

Referring back to FIG. 10, the signature 68 includes electronic signature handled by, for example, a key management center (the license server 4), a content rovider (the content server 3), a settlement organization (the charging server 5), or the like which issues the EKB. A device which received the EKB checks the signature contained in the EKB to determine whether or not the obtained EKB is the EKB issued by the authorized issuer.

Figure 12:
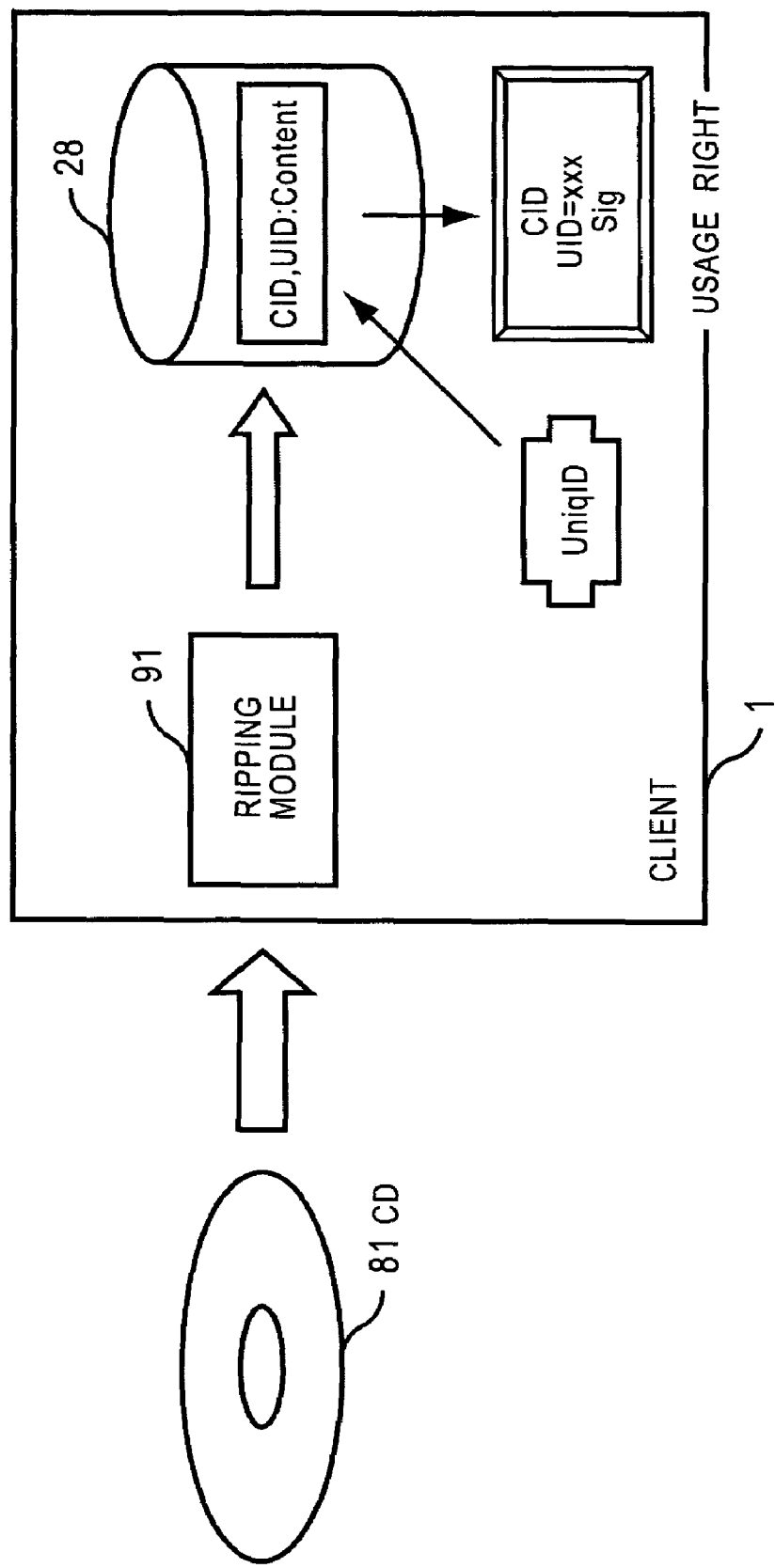
FIG. 12 is a schematic diagram of a content managing system according to the present invention.

FIG. 12 is a schematic diagram showing a process in the above-described key management system in which the content recorded in a CD 81 is retrieved by the client 1.

The CPU 21 of the client 1 executes a predetermined program to control a ripping module 91 so as to retrieve the content stored in the CD 81 connected with the client 1.

The CPU 21 adds to the content retrieved by the ripping module 91 a content ID (CID) and an ID (unique ID (Uniq ID)) unique to the client 1, and causes the resulting data to be stored in the storage unit 28. The unique ID is, for example, a random number having a predetermined number of digits, and the same unique ID as that added to the content is saved by the client 1.

The CPU 21 further generates a usage right to use the content retrieved by the ripping module 91 as a service in the above-described key management system. For example, assuming that the ripping module 91 is a module to which the content retrieved thereby can be checked out three times, a usage right having a description of a usage condition indicating that three checkouts are allowed is generated. The usage right also defines the content ID and unique ID added to the content, and the content and the usage right are corresponded with each other.

When the thus retrieved content is played back, it is determined whether or not playback on a client which is to play back the content is allowed by the usage right, and, in addition, it is determined whether or not the unique ID added to the content and the unique ID of the client which is to play back the content are identical. The content is played back only when playback of the content is allowed by the usage right and when the unique ID added to the content and the unique ID of the client which is to generate the content are identical. Therefore, a client which obtains only the content and the usage right such as by copying them cannot play back the content even if playback is allowed by the usage right.

A series of operations of the client 1 for retrieving and using the content will now be described with reference to a flowchart.

First, a process for the client 1 to retrieve the content is described with reference to the flowchart shown in FIG. 13.

For example, when a predetermined recording medium, such as the CD 81 (optical disk 42), having the content recorded therein is attached to the drive 30 of the client 1 and retrieval of the content is instructed, the CPU 21 of the client 1 controls the ripping module 91 formed by executing a predetermined program to retrieve the content in step S1.

In step S2, the CPU 21 generates a content ID for identifying the content. In step S3, the CPU 21 determines whether or not the unique. ID unique to the client 1 (ripping module 91) has been stored in, for example, the storage unit 28. If it is determined that the unique ID has not been stored, then in step S4, a unique ID having a predetermined number of digits is generated. The generated unique ID is saved in the storage unit 28.

In place of the unique ID generated by the client 1, for example, the unique ID allocated to the client 1 by the license server 4 when the user of the client 1 registers predetermined information in the license server 4 so as to allow for use on the ripping module 91 may be used. If the unique ID is allocated in this way, or if the unique ID has already been generated during previous ripping operation, it is determined in step S3 shown in FIG. 13 that the unique ID is present, and the operation executed in step S4 is skipped.

In step S5, the CPU 21 describes the content ID and the unique ID in an "attribute" area where predetermined attribute information of the content is described. The format of the content is described in detail below.

In step S6, the CPU 21 generates digital signature based on the information described as attribute information using its own secret key. The secret key is delivered from the license server 4, for example, when the information about the client 1 is registered.

In step S7, the CPU 21 generates header data to be recorded in association with the content. The header data includes a content ID, a usage-right ID, a URL indicating the access destination to obtain the usage right, and a watermark.

In step S8, the CPU 21 uses its own secret key to generate a digital signature based on the header data generated in step S7. In step S9, the CPU 21 controls the encryption/decryption unit 24 to encrypt the content using the generated content key. The generated content and information, such as the header attached thereto, are saved in the storage unit 28 in step S10.

Figure 14:
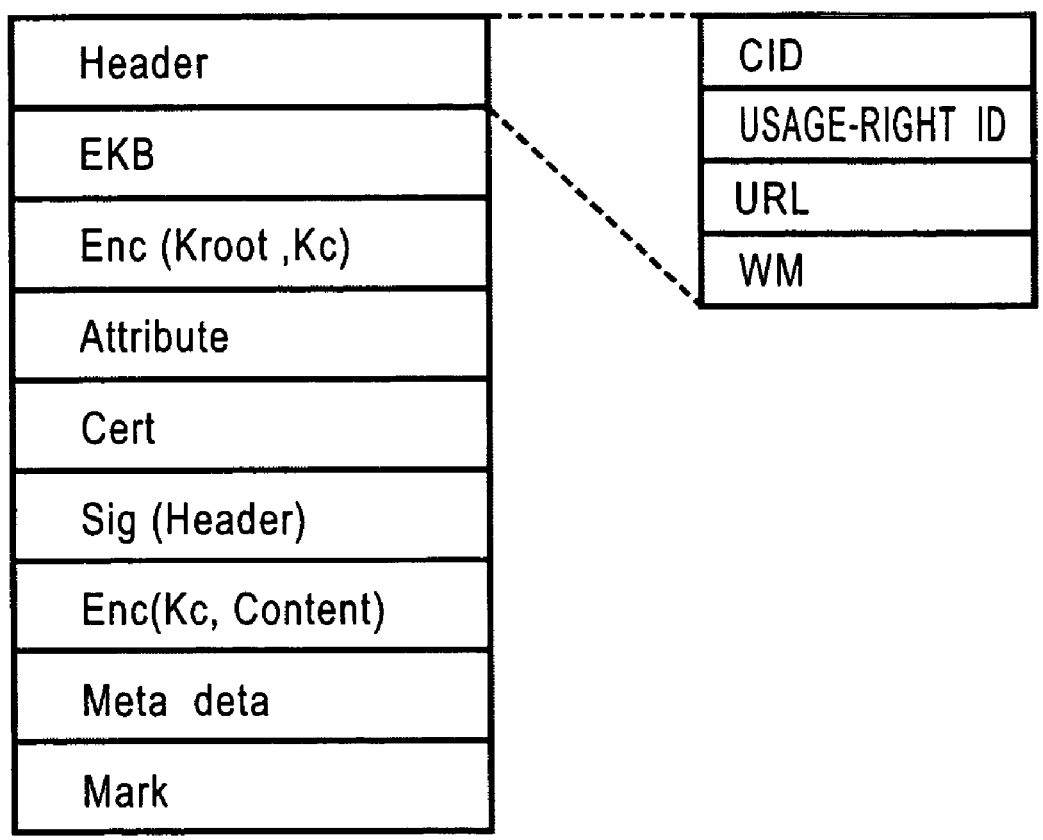
FIG. 14 is a view showing an example format of the content.

FIG. 14 shows an example format of the content.

As shown in FIG. 14, the content includes a header, an EKB, data (Enc(Kroot, Kc)) obtained by encrypting a content key Kc using a root key Kroot, attribute information (Attribute) in which the content ID and the unique ID are described, a certificate (Cert), a digital signature (Sig (Header)) generated based on the header, data (Enc(Kc, Content)) obtained by encrypting the content using the content key Kc, meta data (Meta Data), and a mark (Mark).

In the header, a content ID (CID), a usage-right ID (usage-right ID) for identifying the usage right for the content, a URL of the party (client 1) from which the usage right is obtained, and a watermark (WM) are described.

The attributes of the content include a content ID, a record company ID as identification information for identifying the content provider, an artist ID as identification information for identifying the artist, a unique ID, and so on. In this embodiment, the attributes are used to specify the content defined by the usage right.

The meta data includes various information related to the content; for example, for music content, data including a jacket, a photograph, and lyrics is added to the content as meta data. In the mark, a user ID (leaf ID), an ownership flag, a first-use time, a copy count, and a digital signature generated based on such information are described. The ownership flag of the mark is added, for example, when a usage right to allow the content to be used only for a predetermined period is directly purchased (when the effective period is changed so as to use the content permanently). In the copy count of the mark, a record (log) including the time the content was copied and so forth are described.

While the acquisition (ripping) of content from the CD 81 has been described, for example, content acquired from a predetermined server over the Internet 2 or the like, to which a content ID and a unique ID of the client 1 are also added, is saved by the client 1.

Figure 15:
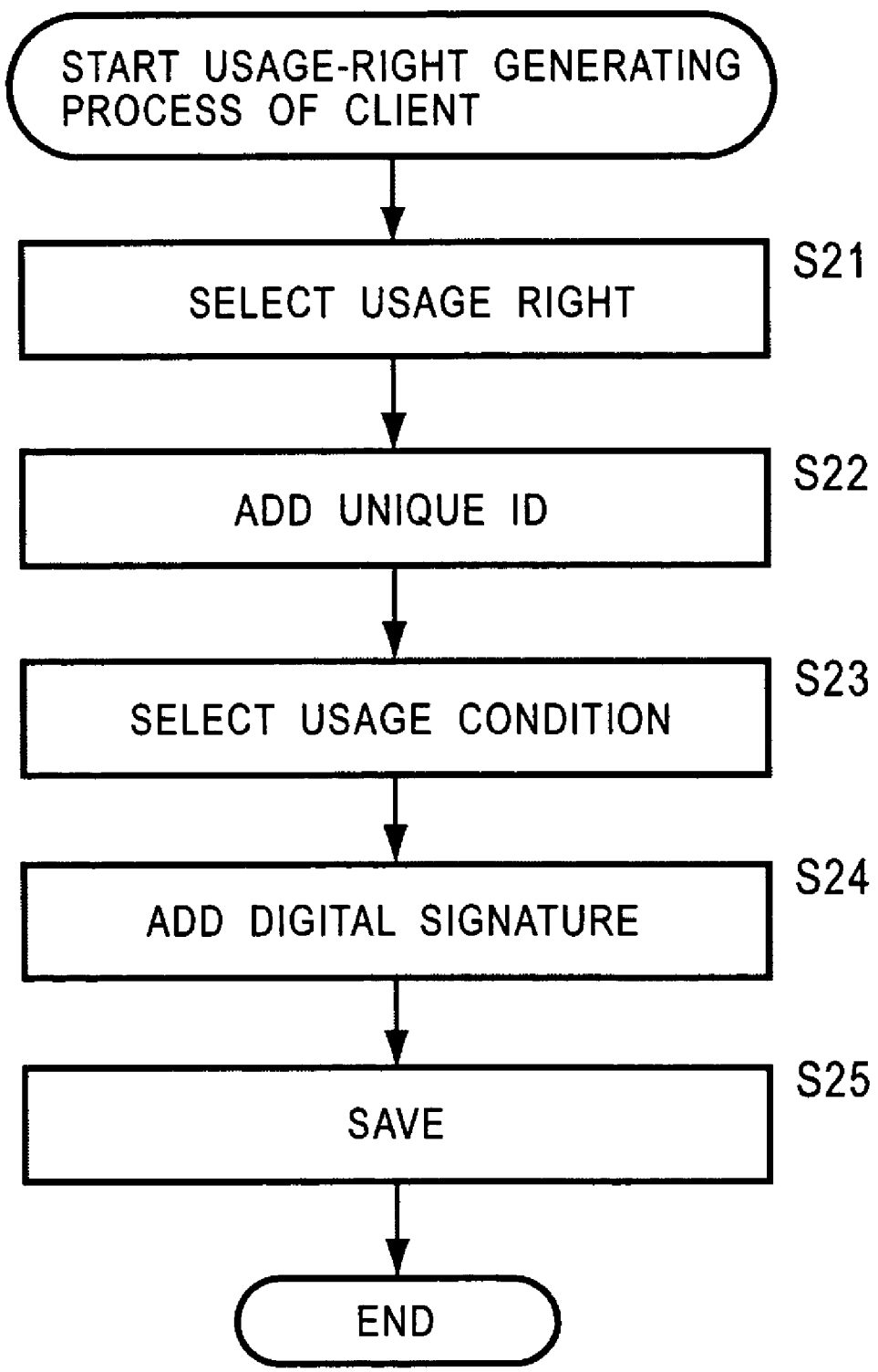
FIG. 15 is a flowchart showing a usage-right generating process of the client shown in FIG. 1.

Next, a process for the client 1 to generate a usage right for the retrieved content is described with reference to the flowchart shown in FIG. 15.

Figure 13:
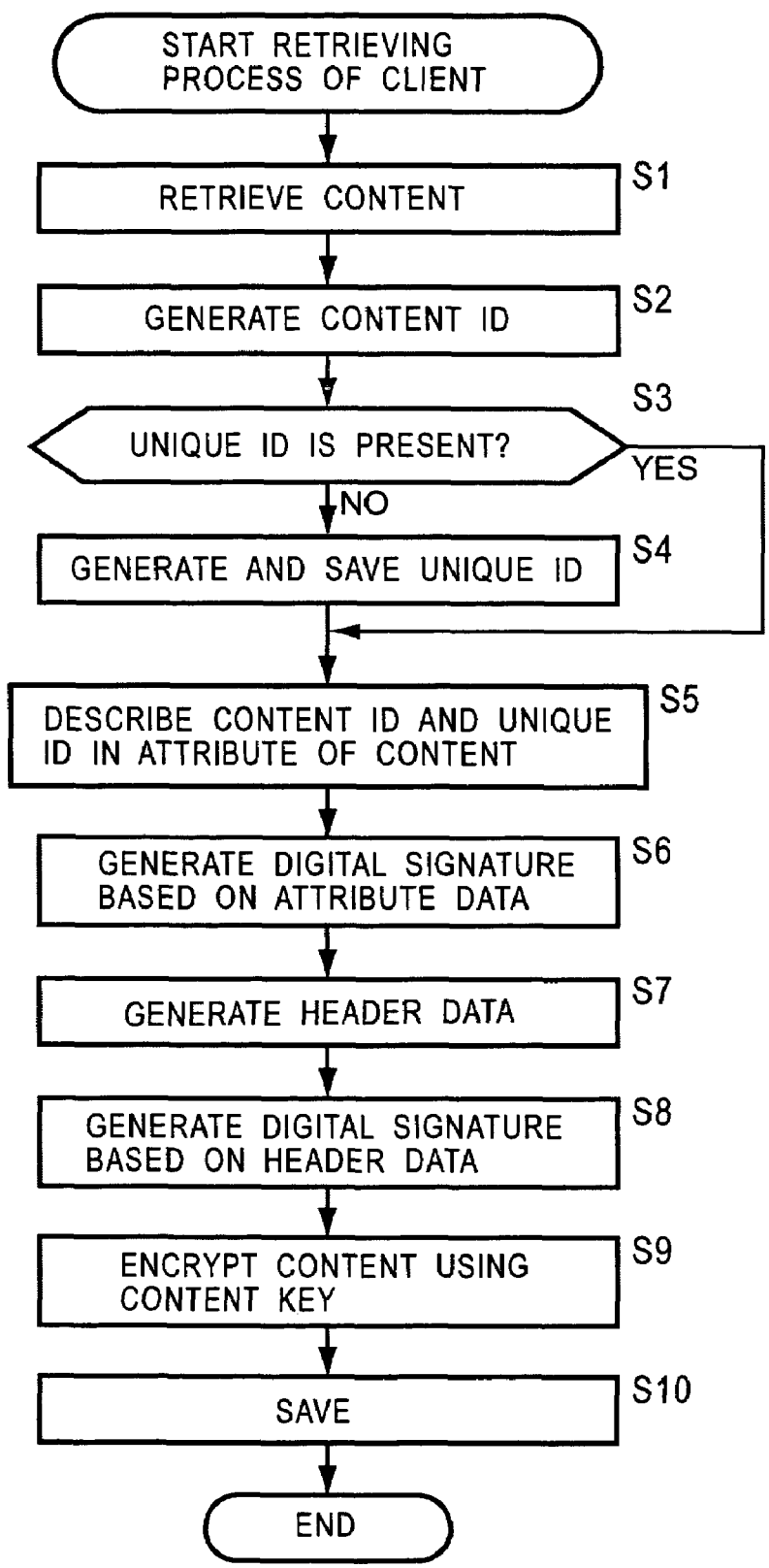
FIG. 13 is a flowchart showing a content retrieving process of the client shown in FIG. 1.

In step S21, a preset usage right to be added to the content retrieved by the ripping module 91 is read from the storage unit 28 as the usage right of the content retrieved in the process shown in FIG. 13. The usage right stored in the storage unit 28 includes information such as a usage-right ID, a version number, a creation date, and an effective period.

In step S22, the CPU 21 adds to the selected usage right a unique ID and information indicating that only the client 1 having the same ID as the unique ID described as attribute information of the content is allowed to play back the content. In step S23, the CPU 21 selects a usage condition and adds it. In an example where the ripping module 91 is defined so that the content retrieved thereby can be concurrently checked out to the ripping module 91 three times, the usage condition indicating that three-time checkout is allowed is selected. In another example where the ripping module 91 is allowed to freely copy the content retrieved thereby, the usage condition indicating this allowance is selected.

In step S24, the CPU 21 generates a digital signature of the data described in the thus selected usage right, and adds it. The usage right with the digital signature added thereto is saved in the storage unit 28 in step S25.

FIG. 16 is an illustration of an example format of the usage right.

"Version" is information in which the version of the usage right is described by separating a major version and a minor version using a dot. "Profile" is information described by a decimal integer value for specifying a limitation on the description method of the usage right. "Usage-right ID" is identification information described by a hexadecimal constant value for identifying the usage right. "Creation date" indicates the date on which the usage right was created. "Effective period" indicates an effective period of the usage right. The effective period of "9999 23:59:59" indicates an unlimited effective period. "Usage conditions" includes information such as an expiration date until which the content can be used based on the usage right, a playback limit within which the content can be played back based on the usage right, the maximum number of playbacks of the content, the number of times the content can be copied (the number of copies allowed) based on the usage right, the maximum number of checkouts, information indicating whether or not the content can be recorded onto a CD-R based on the usage right, the number of times the content can be copied to a PD (Portable Device), information indicating whether or not the usage right can be transferred, information indicating whether or not a use log must be maintained, and so forth. Electronic signature of the usage conditions is an electronic signature corresponding to the usage conditions.

"Constant value" is a constant value which is referred to in the usage conditions or the status of use. "Unique ID" is generated when the content is retrieved. "Electronic signature" is an electronic signature of the entire usage right. "Certificate" is a certificate including a public key of the license server 4.

The storage unit 28 of the client 1 stores the usage conditions of the usage right, as well as the status of use (content conditions), which is information indicating the status of the content or the usage right. The status of use includes information such as the number of times the content was played back based on the usage right, the number of times the content was copied, the number of times the content was checked out, the first playback time and date of the content, the number of times the content was recorded onto a CD-R, and other information indicating records of the content or the usage right. The requirements for content playback are checked based on the usage conditions included in the usage right and the status of use stored in the storage unit 28 together with the usage right. For example, when the number of times the content was played back, which is stored in the status of use, is smaller than the maximum number of playbacks of the content included in the usage conditions, it is determined that the playback requirements are satisfied.

A process for the client 1 which retrieves the content using the ripping module 91 to play back the content is now described with reference to the flowchart shown in FIG. 17.

In step S41, the CPU 21 of the client 1 reads the content instructed by a user operating the input unit 26 from the storage unit 28 based on the content ID, and reads the unique ID described as attribute information of the read content. In step S42, the CPU 21 reads the usage right of the content, of which playback is instructed, based on the usage-right ID, and reads the unique ID described in the read usage right.

In step S43, the CPU 21 reads the saved unique ID, that is, the unique ID of the client 1 from the storage unit 28. Then, in step S44, it is determined whether or not these unique IDs, that is, the unique ID described in the content, the unique ID described in the usage right, and the unique ID saved in the client 1, are identical. It may be determined whether or not only the unique ID described in the content and the unique ID saved in the client 1 are identical.

If the CPU 21 determines in step S44 that all of the unique IDs are identical, then in step S45, it determines whether or not use of the content is permitted by the usage right, based on the usage conditions described therein. For example, the CPU 21 compares the effective period (see FIG. 16) described in the usage right with the current time measured by the timer 20 to determine whether or not the usage right is valid or, in other words, whether or not use of the content is permitted.

If it is determined in step S45 that use of the content is permitted by the usage right, then in step S46, the CPU 21 decodes the content stored (read) in the RAM 23. The content decoding process executed in step S46 is described below with reference to the flowchart shown in FIG. 18.

In step S47, the CPU 21 supplies the content decoded by the encryption/decryption unit 24 to the codec 25 for decoding. Then, the CPU 21 supplies the data decoded by the codec 25 to the output unit 27 via the input/output interface 32 for digital-to-analog conversion, the resulting data being output from the speaker.

If it is determined in step S44 that the unique ID described in the content and the unique ID saved in the client 1 (and also the unique ID described in the usage right) differ, and if it is determined in step S45 that playback of the content is not permitted by the usage right, then in step S48, error processing is carried out. Then, the process ends.

Figure 17:
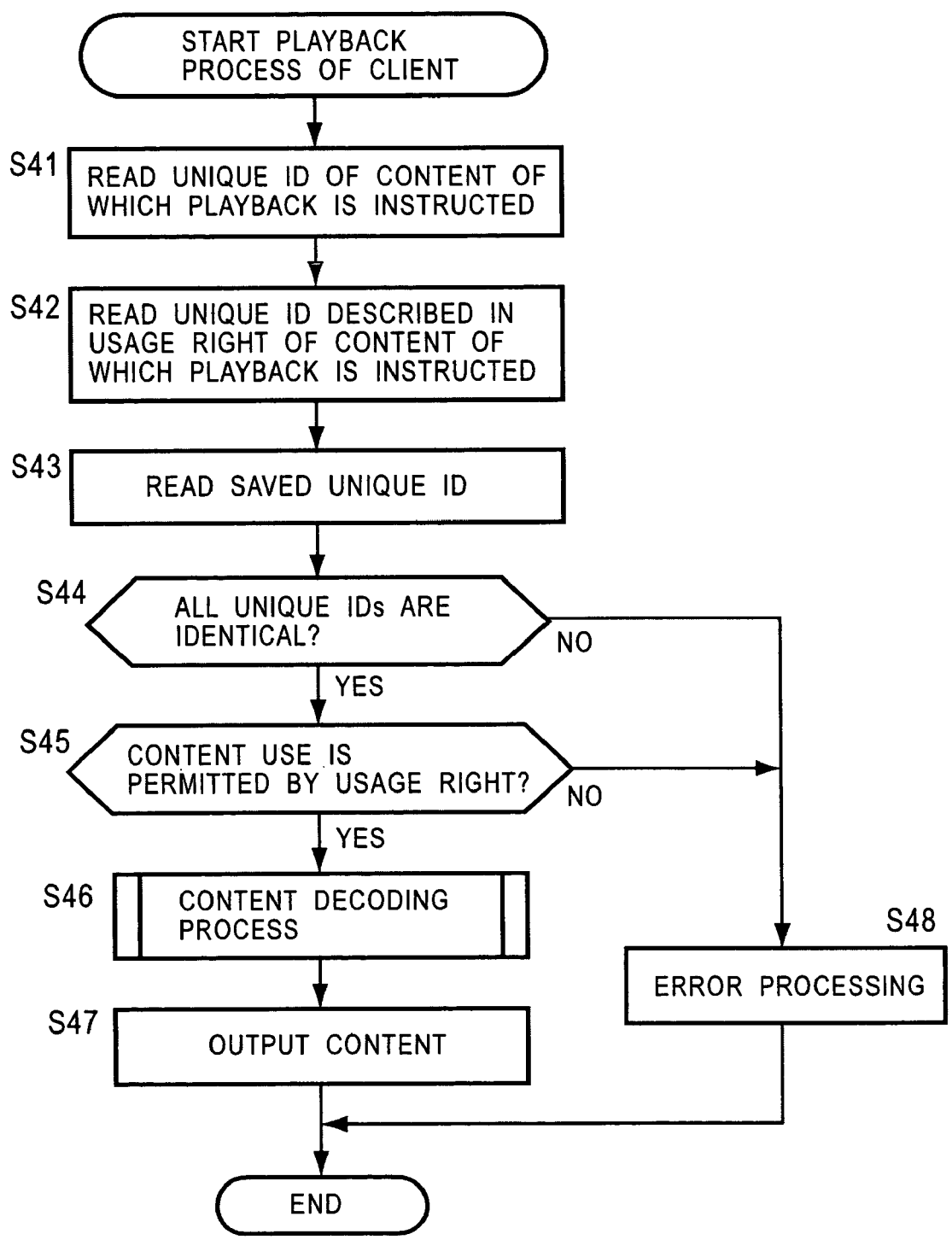
FIG. 17 is a flowchart showing a content playback process of the client shown in FIG. 1.

The details of the decoding process of the client executed in step S46 shown in FIG. 17 are described with reference to the flowchart shown in FIG. 18.

In step S61, the CPU 21 of the client 1 sequentially decodes key information contained in the EKB based on the DNK which is contained in the service data and which is sent from the license server 4 to obtain a root key Kroot (KR). When the CPU 21 obtains the root key Kroot, then in step S62, the content key Kc is decoded using the root key Kroot. As shown in FIG. 14, the content includes the data Enc(Kroot, Kc) formed by encrypting the content key Kc using the root key Kroot.

In step S63, the CPU 21 decodes the content using the content key Kc obtained in step S62.

Figure 19:
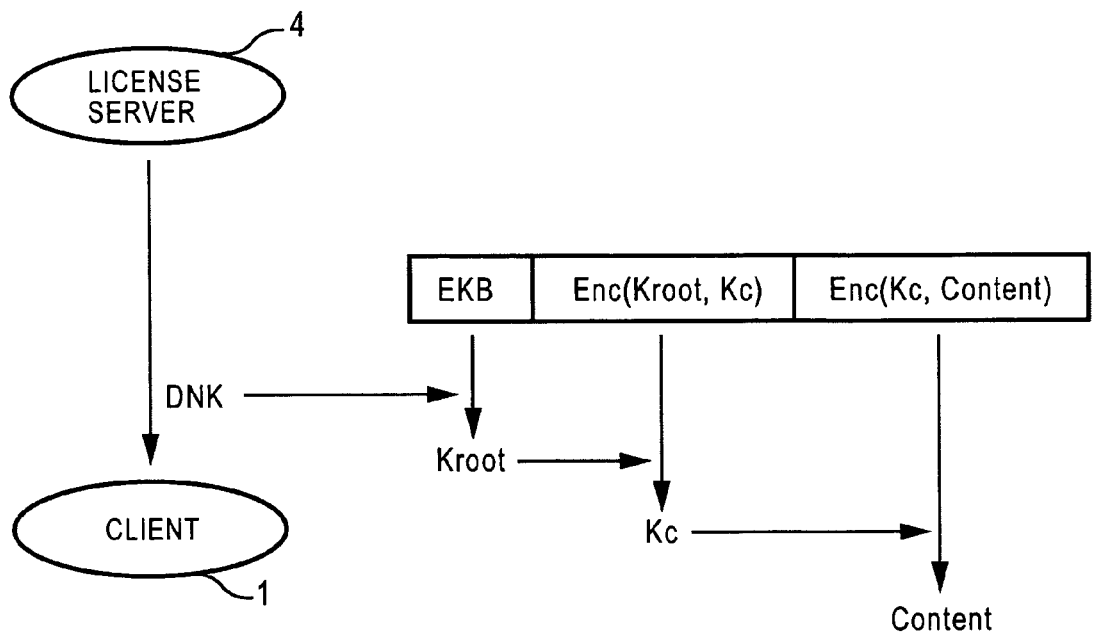
FIG. 19 is a schematic diagram of the decoding process shown in FIG. 18.

FIG. 19 is a schematic diagram of the above-described decoding process. In FIG. 19, the content is saved by the client 1, and only the main information out of the information shown in FIG. 14 is shown.

Figure 18:
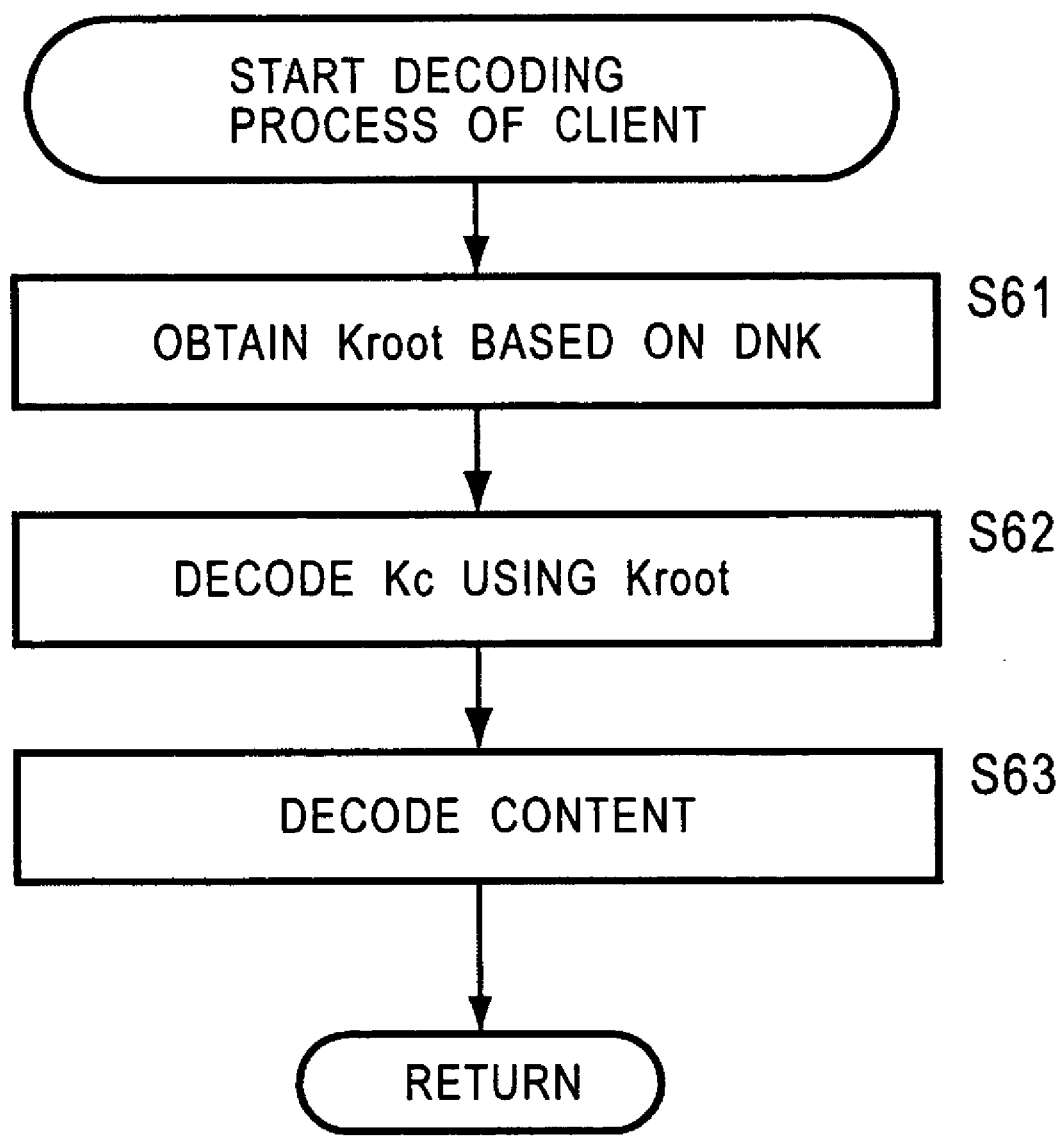
FIG. 18 is a flowchart showing the details of a decoding process of step S46 shown in FIG. 17.
Figure 20:
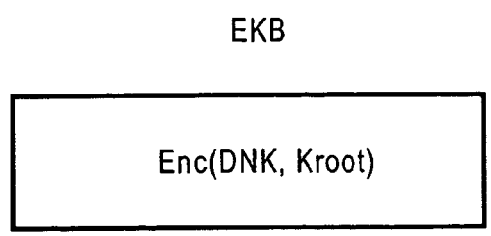
FIG. 20 is a view of example information contained in an EKB shown in FIG. 19.

Specifically, the root key Kroot is obtained from the EKB based on the DNK sent from the license server 4 to the client 1 (in step S61 of FIG. 18), and the data Enc(Kroot, Kc) is decoded using the obtained root key Kroot to thereby obtain the content key Kc (in step S62 of FIG. 18). Then, the data Enc(Kc, Content) is decoded using the content key Kc to obtain the content (Content) (in step S63 of FIG. 18). As shown in FIG. 20, the EKB shown in FIGS. 14 and 19 includes the data Enc(DNK, Kroot) formed by encrypting the root key Kroot using the DNK.

By controlling playback of the content in the above-described way, the content cannot be played back even by a client which obtains the content and the usage right in an unauthorized way (a client whose unique ID is not managed).

In the foregoing process, when checkout of the content retrieved by the client 1 is allowed (when checkout allowed is defined in the usage conditions), the content, the usage right, and the unique ID of the client 1, which are encrypted using a predetermined method, may be sent to another client to which the content is to be checked out from the client 1. In this case, the client which receives such information executes similar processing to that shown in FIGS. 17 and 18 to play back the content. Therefore, checkout/checkin, etc., of the content are carried out under the control of the client 1 which first retrieved the content.

In the foregoing embodiment, the attributes of the content and the content conditions of the usage right are used to specify the usage right necessary to use the content; however, the present invention is not limited thereto. For example, the content may contain a usage-right ID of the usage right necessary to use the content, in which case, the usage right necessary to use it can be uniquely determined once the content is designated, and there is no need for a process to determine matching therebetween.

INDUSTRIAL APPLICABILITY

According to the present invention, content can be provided.

According to the present invention, furthermore, unauthorized use of content can be prevented.

The invention claimed is:

1. An information managing apparatus for managing content, comprising:

content retrieving means for retrieving the content;

identification information obtaining means for obtaining identification information for identifying the information managing apparatus;

content storing means for storing the content and adding the identification information to the content;

usage-right storing means for storing a usage right regulating use of the content, the usage right comprising the identification information and information for allowing use of the content on an apparatus having the same identification information as the identification information added to the content, wherein the usage right allows use of the content in a hierarchical tree-based key management system, wherein the apparatus is a device node leaf of the hierarchical tree-based key management system;

encryption means for encrypting the content using a content key, wherein the content key is generated based on a root key of the hierarchical tree-based key management system; and means for allowing playback of the content only when the playback is allowed by the usage right and the identification information added to the content and the identification information obtained by the identification information obtaining means correspond.

2. An information managing apparatus according to claim 1, wherein the content retrieving means retrieves the content from a recording medium attached to the information managing apparatus.

3. An information managing apparatus according to claim 1, wherein the identification information obtaining means uses a generated random number as the identification information.

4. An information managing apparatus according to claim 1, wherein the device node leaf is configured below a playback-only device sub-category node on the hierarchical tree-based key management system.

5. An information managing method for an information managing apparatus for managing content, the information managing method comprising:

retrieving the content;

obtaining identification information for identifying the information managing apparatus;

storing the content and storing the resulting content, to which the identification information is added;

storing a usage right regulating use of the content, the usage right comprising the identification information and information for allowing use of the content on an apparatus having the same identification information as the identification information added to the content, wherein the usage right allows use of the content in a hierarchical tree-based key management system, wherein the apparatus is a device node leaf of the hierarchical tree-based key management system;

generating a content key based on a root key of the hierarchical tree-based key management system;

encrypting the content using the content key; and allowing playback of the content only when the playback is allowed by the usage right and the identification information added to the content and the identification information obtained by the identification information obtaining means correspond.

6. An information managing method according to claim 5, wherein the device node leaf is configured below a playback-only device sub-category node on the hierarchical tree-based key management system.

* * * * *